[122.]
JOHN DEMING.
Improvement in Spoke-Tenoning and Hub-Boring Machines.
No. 4,552. Reissued Sep. 12, 1871.
Fig. 1
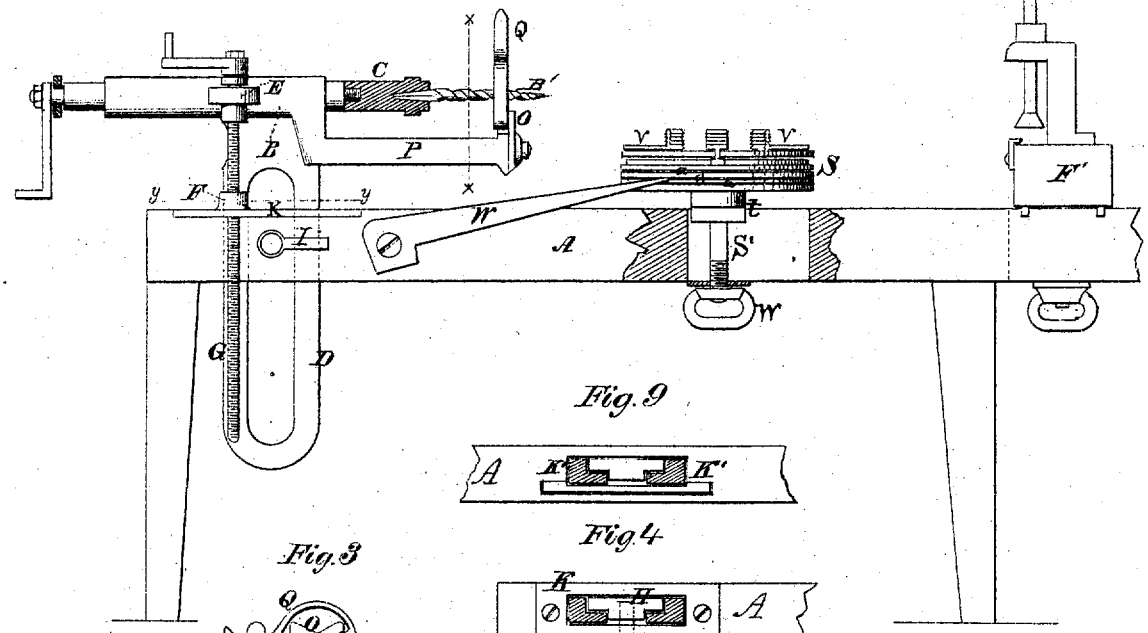
Fig. 9
Fig. 4
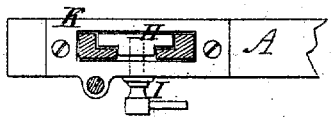
Fig. 3
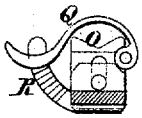
Fig. 2
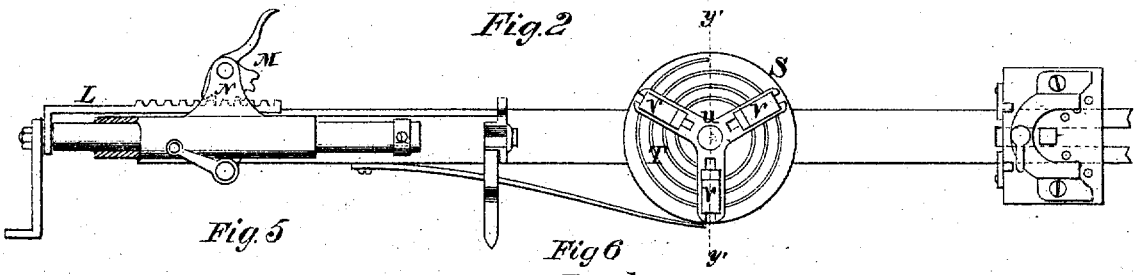
Fig. 5
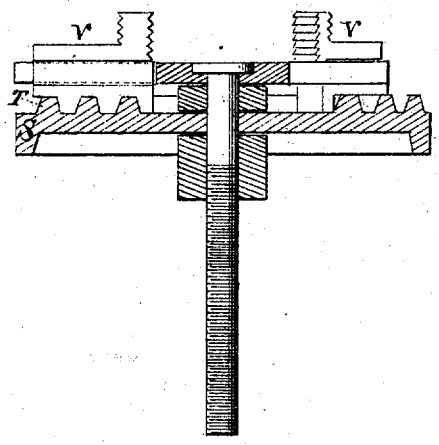
Fig 6
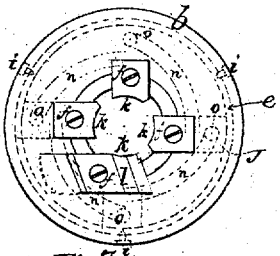
Fig. 8
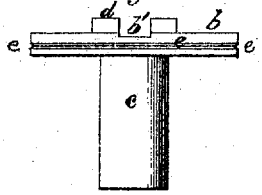
Fig. 7
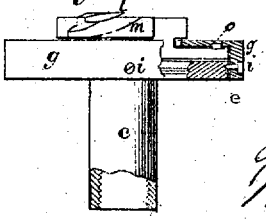
Witnesses
R. T. Campbell.
J. N. Campbell.
Inventor
John Deming
by his Atty
Marion Henrick Lawrence
AM. PHOTO-LITHOGRAPHIC CO. N.Y. (OSBORNE'S PROCESS.)

UNITED STATES PATENT OFFICE.

JOHN DEMING, OF SALEM, OHIO, ASSIGNOR TO HIMSELF AND A. R. SILVER, OF SAME PLACE.

IMPROVEMENT IN SPOKE-TENONING AND HUB-BORING MACHINES.

Specification forming part of Letters Patent No. 103,157, dated May 17, 1870; reissue No. 4,552 dated September 12, 1871.

*To all whom it may concern:*

Be it known that I, JOHN DEMING, of Salem, in the county of Columbiana and State of Ohio, have invented a new and Improved Spoke-Tenoning and Hub-Boring Machine; and I do hereby declare that the following is a full, clear, and exact description thereof, reference being had to the accompanying drawing making a part of this specification, in which—

Figure 1 is a side elevation of the machine, a part being broken out to show the adjustable connection of the hub-centering and holding devices. Fig. 2 is plan view of Fig. 1. Fig. 3 is a transverse section taken on the line *x x*, showing the spoke-centering devices. Fig. 4 is a horizontal section on the line *y y*, showing the adjusting devices for raising, lowering, and holding the boring or tenoning-tool head. Fig. 5 is a sectional elevation on the line *y′ y′*, showing the hub-centering and holding devices, a face view of which is seen in Fig. 2 at S. Fig. 6 is a face view of the tenoning-tool. Fig. 7 is a side elevation, partly in section. Fig. 8 is a detail view of the improved tenoning-tool, and Fig. 9 is a partial view of the bottom of the tool-head holder.

Similar letters of reference indicate corresponding parts in the several figures.

This invention relates to certain novel improvements on machinery for boring hubs and forming tenons on the spokes of wheels, as will be hereinafter explained.

The following description of my invention will enable others skilled in the art to understand it.

A is a long frame or bench, such as commonly used for such machines, with vertical slots near each end and another near the center, for the support of the several devices used thereon. B′ is the boring-tool, and C the spindle for the support of the tools. D is a slotted shank projecting down through the slot in the end of the bench A, for supporting the tool-head and adjusting it up or down.

My invention relating to this head consists in the application of the ear E to the head, the nut F to the plate or bench, and the adjusting-screw G for raising or lowering the head; also, in providing the clamping-nut H and clamping-screw I for clamping the shank D against the side of the slot through the bench, for the said shank to hold the head firmly at any desired height above the bench. I also provide a stay-plate, K, on the top of the frame, at the side against which the shank is clamped, and extending around the edges, with an extension, K′, passing through the slot, for the shank D to hold it more firmly and truly than it could be held if clamped against the wood. In this case the shank D is rabbeted on the side against which the clamping-nut bears, and the clamping-nut is also rabbeted, so that a part thereof will fit into the space of the slot in the shank; but any other equivalent arrangement thereof may be made.

For feeding the spindle C of the boring or tenoning-tool I have attached, near the rear end of it, a toothed bar, L, running parallel with it outside of the sleeve, and provided there with a segmental gear and handle, M, supported in brackets N attached to the sleeve, and arranged to work the said toothed bar back and forth by vibrating the segment. The said bar L is connected to the spindle so as to cause it to slide while allowing it to turn.

For centering and holding the ends of the spokes I have provided the vertically-adjustable notched plate O at the end of the arm P for a rest for the spokes, and the spring clamping-lever Q and ratchet-bar R. The notched plate O being adjusted to the right height, and a spoke being placed therein, the spring-lever is pressed down on it and sprung laterally into the ratchet-notches of the bar R.

For centering and holding the hubs and holding the fellies I have provided the disk S, having a vertical shank for attachment to the bench, in the central slot, and the spiral ribs T on the upper face, the radially-slotted jaw-holder U and the jaws V working in the said jaw-holder to and from the center, and engaging, by means of extensions on the under sides, with the ribs T, whereby they are moved when either the holder or the disk is turned, the other being held stationary.

The jaws V, which clamp the object to be held between their vertical serrated projections, are arranged so that they may be readily taken out and reversed in position to vary their capacity for holding large or small objects. The said vertical projections of the jaws being at one end thereof will, by thus reversing the said jaws, be brought nearer to or further from the center.

In order to make use of this apparatus for spacing the hubs for boring the holes at regular distances apart, and for different numbers of holes, I have provided the periphery of this disk S with a number of rows of holes or countersinks for the reception of the point of a spring-holder, W, and, in order to prevent the latter from accidentally moving from one row to another while turning from one hole to another of a row, I have provided annular grooves *a* in the periphery of the disk connecting the holes of each row, to serve as guides to the pointer while the disk is being turned to bring the respective holes to the pointer. This holding apparatus is applicable, also, for holding the fellies for boring, by clamping them between two of the jaws on one side, and one on the other.

For forming the tenons on the ends of the spokes I provide the improved cutting or tenoning-tool, represented in Figs. 6, 7, and 8, wherein I have represented a face-plate, *b*, with four grooves radiating, or nearly so, from the center, a shank, *c*, for attachment to the spindle C, a projection, *d*, from the face, and a V-groove, *e*, in the periphery, to which four jaws, *f*, with shanks J, shown dotted, fitting in the grooves *b'*, are secured by the cap *g* fitting over the periphery, and held by screws *i* taking into the groove *e*. These jaws have concave faces *k* concentric to the axis of the space between them, which faces serve as guides for the cutter *l* attached to one of the said jaws *f*; also for the tenon after it is formed, which, as it is being formed, passes into the said space. This cutter *l* consists of a thin plate of steel attached to the front face of the jaw by a screw, so that its cutting-edge projects sufficiently to give the required clearance in cutting, and the cutting-edge projects at the outer point in the direction in which it turns in advance of the other part, so that the spoke is cut at the surface first, and in a way to deliver the cutting force thereon inward instead of outward, as would be the case if the said edge was formed on a radial line, and thereby the splitting of the timber at the surface, which would be the case in the latter arrangement, is avoided. A groove, *m*, is provided in the jaw which holds the cutter, behind the latter, to afford clearance for the chips. For adjusting these jaws and the cutter for larger or smaller tenons, the cap *g* is provided with the curved grooves, shown in dotted lines at *n*, and the jaws have pins *o* taking into them, so that by turning the cap on the disk *b* they will be forced toward or from the center as the said cap is turned to the right or left.

Having described my invention, what I claim as new, and desire to secure by Letters Patent, is—

1. The combination of the jaw-holder *u*, the jaws V, circularly-turning plate S, with the screw-bolt S' and hub *t*, having bosses, and the nut W, all in such manner that the jaws and plate are adjustable, substantially as and for the purpose set forth.

2. The segment-ratchet R, pivoted lever Q, and forked rest O, constructed and arranged as described, and combined with the arm P of the spindle-supporter, substantially in the manner described and shown.

3. The combination of the single clamp-screw I, the nut H, angular plate K K', and slotted standard D of tool-head, all in the manner shown and described.

4. The improved boring device, consisting of the tool-head B provided with the ear E, as shown, the spindle C, slotted standard D, screw G, nut F, clamping-nut H, and clamp-screw I, substantially as described.

5. The self-centering chuck S *u* V *t* S' W, made adjustable circularly, applied in an oblong slot of the frame A, and made adjustable lengthwise of the frame in said slot, in combination with the vertical adjustable tool-head B P O and clamp Q R, substantially as described.

JOHN DEMING.

Witnesses:
A. B. GARRIGUES,
M. FRANK TABER.

(122.)